(12) United States Patent
Fournier et al.

(10) Patent No.: US 6,811,315 B2
(45) Date of Patent: Nov. 2, 2004

(54) COMPLIANT SUPPORT FOR INCREASED LOAD CAPACITY AXIAL THRUST BEARING

(75) Inventors: Yves Fournier, St-Luc (CA); Gilles Beauvais, Montrëal (CA)

(73) Assignee: Pratt & Whitney Canada Corp., Quebec (CA)

( * ) Notice: Subject to any disclaimer, the term of this patent is extended or adjusted under 35 U.S.C. 154(b) by 0 days.

(21) Appl. No.: 10/321,515

(22) Filed: Dec. 18, 2002

(65) Prior Publication Data

US 2004/0120617 A1 Jun. 24, 2004

(51) Int. Cl.$^7$ ............................................... F16C 32/03
(52) U.S. Cl. ........................................ 384/105; 384/106
(58) Field of Search ................................ 384/105, 106, 384/103

(56) References Cited

U.S. PATENT DOCUMENTS

| | | | |
|---|---|---|---|
| 4,184,720 A | | 1/1980 | Zacherl |
| 4,331,365 A | * | 5/1982 | Miller, Jr. .................... 384/105 |
| 4,668,106 A | * | 5/1987 | Gu .............................. 384/105 |
| 4,776,077 A | | 10/1988 | Gu |
| 4,797,009 A | | 1/1989 | Yamazaki |
| 5,113,670 A | | 5/1992 | McAuliffe et al. |
| 5,248,205 A | | 9/1993 | Gu et al. |
| 5,450,719 A | | 9/1995 | Marsh |
| 5,921,683 A | | 7/1999 | Merritt et al. |
| 6,024,491 A | | 2/2000 | Bak |
| 6,158,892 A | | 12/2000 | Stewart et al. |
| 6,286,303 B1 | | 9/2001 | Pfligler et al. |
| 6,344,741 B1 | | 2/2002 | Giguere et al. |
| 6,354,741 B1 | | 3/2002 | Saville et al. |

* cited by examiner

Primary Examiner—Thomas R. Hannon
(74) Attorney, Agent, or Firm—Ogilvy Renault

(57) ABSTRACT

A compliant support for an axial thrust air bearing between a shaft and a housing with an annular thrust runner extending radially from the shaft having a runner bearing surface. The housing has a housing bearing surface and an air inlet in communication with a source of pressurized air. An annular foil support sleeve is disposed on the housing bearing surface, having an air foil surface with an array of foils. The foils serve to conduct air from the air inlet forming a pressurized air curtain between the runner bearing surface and foils on the the sleeve and is then disposed of through an air outlet. The sleeve has a compliant surface with at least one compliant annular ring. The compliant surface includes at least one compliant annular ring such as a fluorocarbon O-ring for low temperature service under 300° F.; a fluorosilicon O-ring for mid-range temperature service 300–600° F.; or a metallic mesh ring for high temperature service over 600° F.

12 Claims, 3 Drawing Sheets

COMPLIANT SUPPORT FOR INCREASED LOAD CAPACITY AXIAL THRUST BEARING

TECHNICAL FIELD

The invention relates to a compliant support for an axial thrust air bearing.

BACKGROUND OF THE ART

Air bearings or foil bearings have been used in high speed turbo machinery, motors, turbochargers, or fluid processing machines which take advantage of their inherent advantages with a flow of compressed air used as a lubricant and coolant. Oil lubricated bearings impose a much higher cost and maintenance load as well as reliability problems associated with oil leakage, filtering and conduits.

However, compared to small scale machines, a gas turbine engine produces relatively high thrust loads on the bearings requiring larger bearings with a higher load capacity. The conducting of air through the bearings creates a compressed air cushion or air film which lifts the bearing surfaces apart to minimize friction.

For example, U.S. Pat. No. 6,286,303 discloses air foil bearings for a gas turbine engine including radial air foil bearings and axial thrust air foil bearings. To date however the permissible tolerance for relatively large diameter air foil bearings, especially axial thrust bearings is less than optimum regarding misalignment, parallelism, squareness and waviness of the running surface as well as load capacity and damping capacity during engine surges.

It is an object of the present invention to provide a simple compliant support for increased load capacity and load damping for axial thrust bearings.

It is a further object of the invention to provide compliant supports for axial thrust bearings that provide an increased manufacturing and operating tolerance for misalignment, parallelism, squareness and/or waviness of the running surface as well as increasing load and damping capacity for the axial thrust air foil bearings.

Further objects of the invention will be apparent from review of the disclosure, drawings and description of the invention below.

DISCLOSURE OF THE INVENTION

A complaint support for an axial thrust air bearing between a haft and a housing with an annular thrust runner extending radially from the shaft having a runner bearing surface. The housing has a housing bearing surface and an air inlet in communication with a source of pressurized air. An annular foil support sleeve is disposed on the housing bearing surface, having an air foil surface with an array of foils. The foils serve to conduct air from the air inlet forming a pressurized air curtain between the runner bearing surface and foils on the sleeve and is then disposed of through an air outlet. The sleeve has a complaint surface with at least one compliant annular ring. The compliant surface includes at least one compliant annular ring such as a fluorocarbon O-ring for low temperature service under 300° F.; a fluorosilicon O-ring for mid-range temperature service 300–600° F.; or a metallic mesh ring for high temperature service over 600° F.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

It will be understood that the invention is applicable to almost any type of engine such as a gas turbine engine, other motors, generators and turbochargers.

Axial thrust bearing 1 bears the axial loads imposed by engine operation on the shaft 2. Rapid fluctuations in axial load caused by engine surges for example, are accommodated as explained below.

Figure 1:
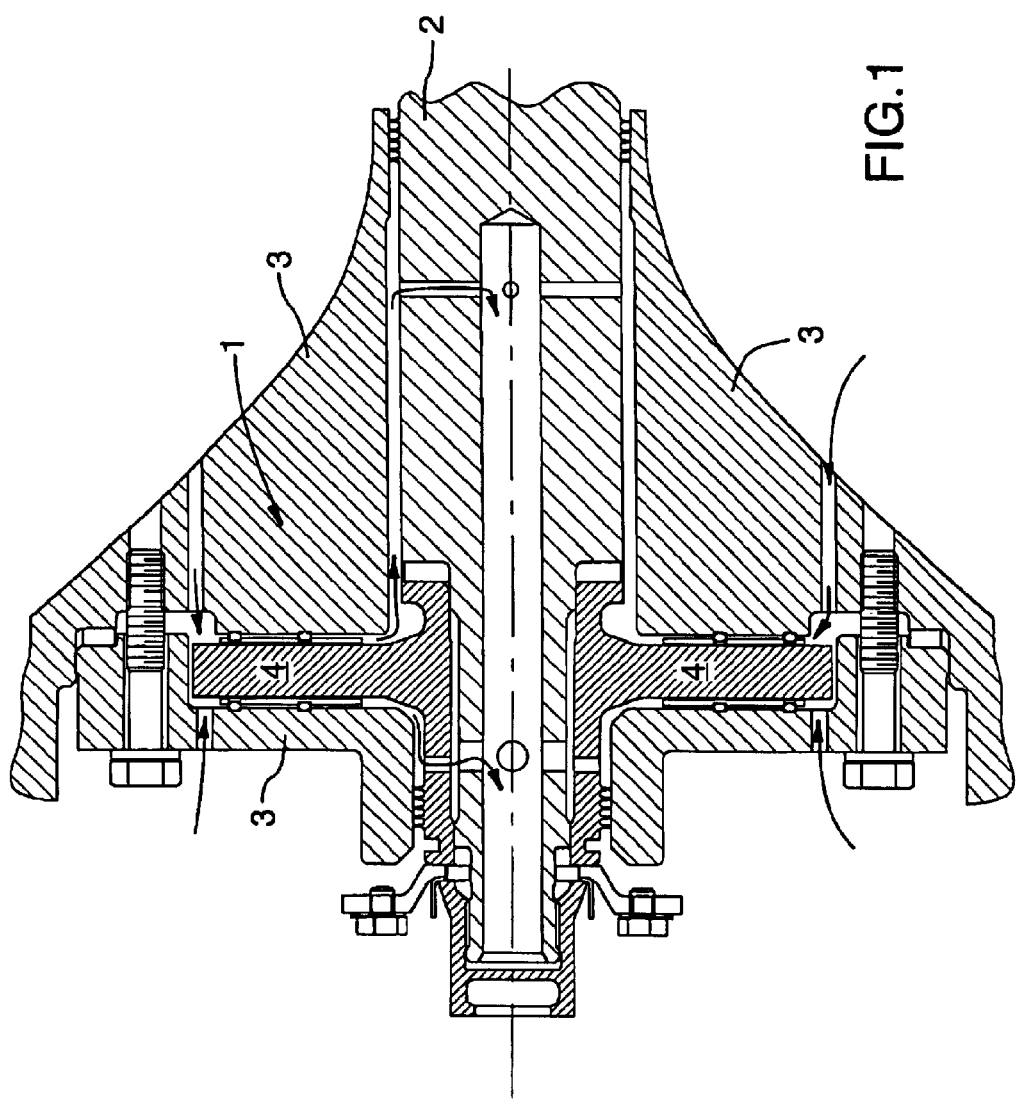
FIG. 1 is an axial cross-sectional view of an axial thrust air foil bearing with compliant support in accordance with the invention disposed on two sides of a rotary flange extending radially from a shaft into a bearing housing with compressed air flow indicated with arrows.

FIG. 1 shows an axial cross-sectional view through an air foil axial thrust bearing 1 in accordance with the invention. The axial thrust air bearing 1 transfers axial loads between the shaft 2 and the bearing housing 3. An annular thrust runner flange 4 extends radially from the shaft 2 and in the embodiment shown has a forward runner bearing surface 5 and a rearward runner bearing surface 6. The housing 3 also has a forward housing bearing surface 7 and a rearward housing bearing surface 8.

Air inlets 9 are in communication with the source of air such as the compressor ducted from an air bleed (not shown). Air from the inlets 9 is conducted over a plurality of foils 10 which in the embodiment shown are located on the air foil surface of each sleeve 13 facing the abutting surfaces 5, 6 of the flange 4.

Figure 4:
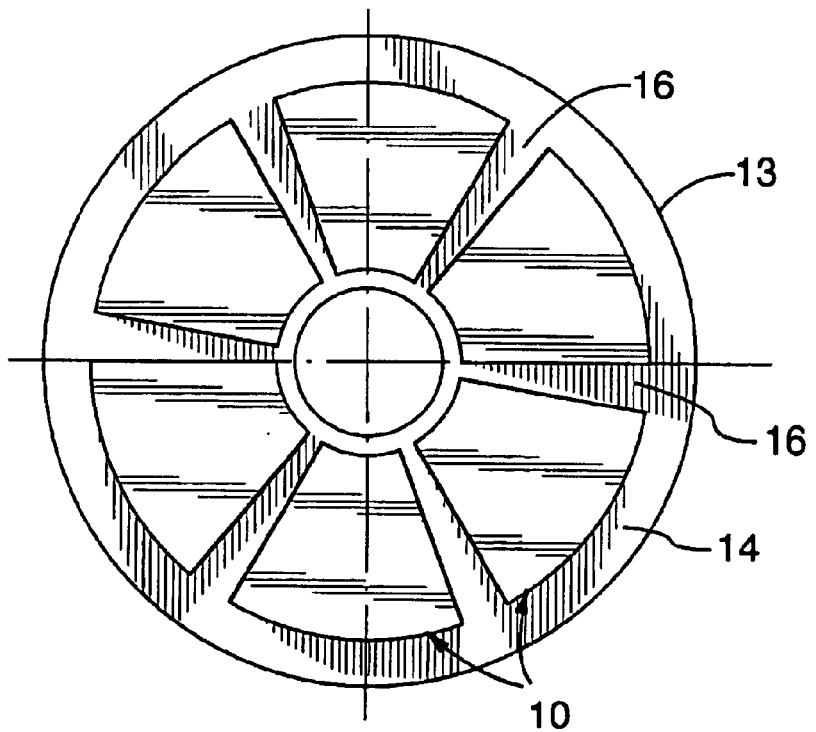
FIG. 4 is a radial sectional view along line 4—4 of FIG. 2, showing the foils within the rotary flange facing surface of the sleeve.

The foils 10 (best seen in FIG. 4) create a cushion of air flowing between the adjacent bearing surfaces. As shown the foils 10 are formed as circumferentially spaced apart axially protruding planar surfaces with radially extending air channels 16 between adjacent foils 10. The cross-section of the channels 16 decreases as the air flows downstream. The airfoils 10 are positioned on the runner side of the sleeves 13 to create a compressed air curtain that serves to lubricate the boundary between engaging surfaces. A curtain of air is conducted from the inlets 9 over the air foils 10 between the runner bearing surfaces 5, 6 and the facing sleeve surfaces to the outlets 11 as indicated by arrows in FIG. 2.

A sleeve 13 with compliant annular rings 12 is positioned between opposing surfaces of the flange 4 and bearing housing 3 providing the advantages that load capacity is increased and damping of axial loading during engine surges is improved. In addition, tolerances are increased to accommodate misalignment between components, parallelism, errors in squareness and waviness of the bearing surfaces 5–8.

Figure 3:
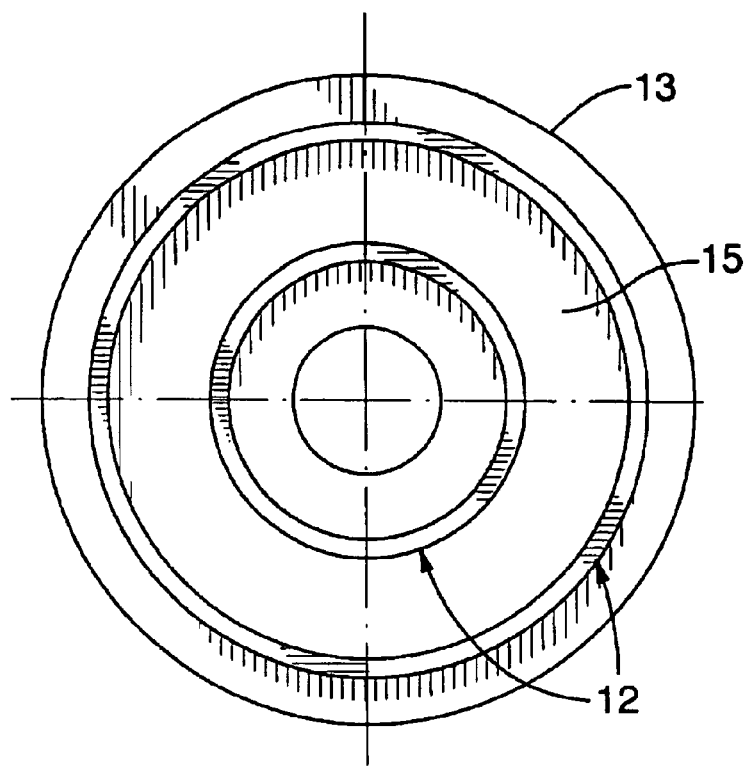
FIG. 3 is a radial sectional view along line 3—3 of FIG. 2, showing the compliant rings within the compliant surface of the sleeve.

Of course, creation of a large gap would defeat the purposes of the foils 21 which require relative close running gap in order to create a compressed air curtain in a contained space. The sleeve 13 includes the air foils 10 with minimal gap between the opposing surfaces. The sleeve 13 has a foil surface 14 and a compliant surface 15. In the embodiment shown the compliant surface 15 and the bearing housing surfaces 7, 8 include annular grooves for housing two coaxial compliant annular rings 12. FIG. 3 shows the rings 12 mounted in the grooves of the sleeve 13.

Depending on the operating temperature of the bearing, different materials may be utilized for the compliant annular rings 12 however in all cases the compliant rings 12 should retain a high degree of elasticity to accommodate the necessary load damping or load bearing while maintaining sufficient clearance between the air foils 10 and runner bearing surfaces 5, 6 for proper operation of the air foil bearing.

Where operating temperature service is less than 300° F. a fluorocarbon O-ring is proposed as a compliant ring 12. Where operating temperatures are between 300° F. and 600° F., a fluorosilicon O-ring can be used as a compliant ring 12 and where operating temperatures are in excess of 600° F., a heat resistant metallic mesh ring 12 is anticipated.

Figure 2:
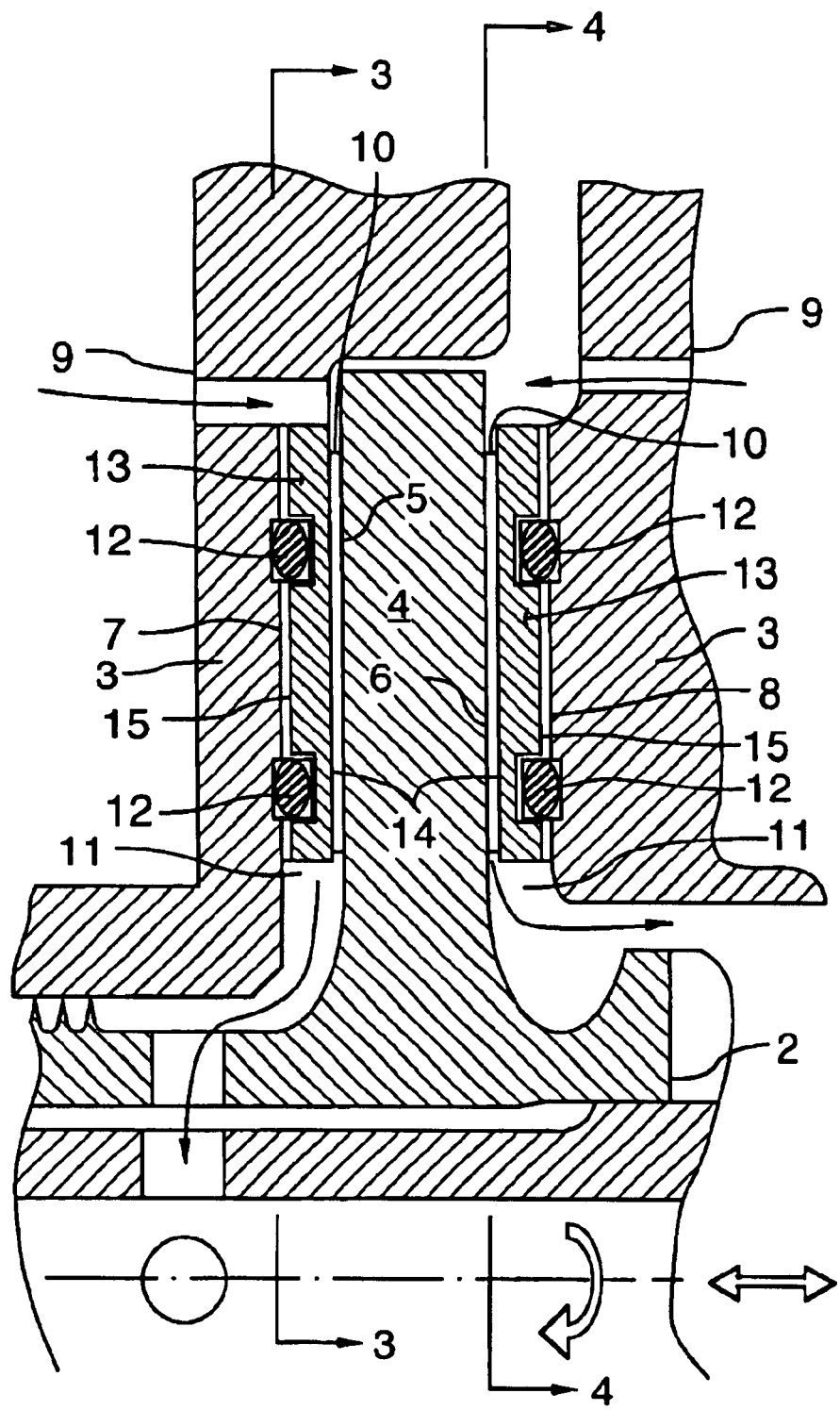
FIG. 2 is a detailed axial sectional view showing the details of the sleeve and rotary flange with air flow over foils.

In the embodiment shown the compliant support includes two annular foil support sleeves 13. However depending on the load capacity, and loading direction, a single sleeve 13 or multiple sleeves 13 may be utilized. Further, in the embodiment shown the inlets 9 are disposed radially outwardly from the flange 4 and the air outlets 11 are disposed adjacent to a radially inward portion of the flange 4 close to the shaft 2. However it will apparent that depending on availability of compressed air, air flow may be reversed, i.e. flowing radially outwardly as opposed to radially inwardly as shown in FIG. 2.

Although the above description relates to a specific preferred embodiment as presently contemplated by the inventors, it will be understood that the invention in its broad aspect includes mechanical and functional equivalents of the elements described herein.

We claim:

1. A compliant support for an axial thrust air bearing between a shaft and a housing, an annular thrust runner extending radially from the shaft having a runner bearing surface, the housing having a housing bearing surface and an air inlet in communication with a source of pressurized air, the compliant support comprising:

an annular foil support sleeve, disposed on the housing bearing surface, including air foil means, on an air foil surface, comprising a plurality of foils, for conducting air from the inlet in a pressurized air curtain between the runner bearing surface and the sleeve to an outlet, the sleeve having a compliant surface with at least one compliant annular ring.

2. A compliant support according to claim 1 wherein the compliant surface includes two coaxial compliant annular rings.

3. A compliant support according to claim 1 wherein the compliant annular ring is selected from the group consisting of: a fluorocarbon O-ring; a fluorosilicon O-ring; and a metallic mesh ring.

4. A compliant support according to claim 3 wherein the fluorocarbon O-ring has an operating temperature service less than 300° F.

5. A compliant support according to claim 3 wherein the fluorosilicon O-ring has an operating temperature service from 300° F. to 600° F.

6. A compliant support according to claim 3 wherein the metallic mesh ring has an operating temperature service greater than 600° F.

7. A compliant support according to claim 1 wherein:

the annular thrust runner comprises a radially extending flange having a forward and a rearward runner bearing surface;

the housing includes a forward and a rearward housing bearing surface; and the compliant support comprises two annular foil support sleeves.

8. A compliant support according to claim 7 wherein the inlet is disposed radially outward of the flange.

9. A compliant support according to claim 7 wherein the outlet is disposed adjacent a radially inward portion of the flange.

10. A compliant support according to claim 1 wherein the air foils comprise circumferentially spaced apart axially protruding planar surfaces with radially extending air channels defined between adjacent air foils.

11. A compliant support according to claim 10 wherein the air channels decrease in cross-sectional area in a downstream direction.

12. A compliant support according to claim 11 wherein the channels have a rectangular cross-section.

* * * * *